June 26, 1951     J. P. CASTELLANO     2,558,235

PNEUMATIC CAMERA FLASH SYCHRONIZER

Filed June 3, 1948

INVENTOR
Joseph P. Castellano
BY
Morgan, Finnegan and Durham
ATTORNEYS

Patented June 26, 1951

2,558,235

UNITED STATES PATENT OFFICE 2,558,235

PNEUMATIC CAMERA FLASH SYNCHRONIZER

Joseph P. Castellano, Brooklyn, N. Y.

Application June 3, 1948, Serial No. 30,844

3 Claims. (Cl. 95—11.5)

The present invention relates to a device for synchronizing the operation of a camera shutter and a flash bulb and particularly relates to those cameras employing a spring-actuated shutter.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

It is an object of the present invention to provide a camera flash synchronizer which is simple and inexpensive and also mechanically separable from the camera so that it can be easily removed and replaced.

A further object of this invention is to provide a mechanically operated synchronizing device any one of whose parts may be replaced upon improper operation.

An additional object of this invention is to provide a mechanically operated synchronizing mechanism whose parts may be adjusted in time relationship to each other so that the flash bulb and camera shutter will at all times act simultaneously.

One of the chief advantages of this invention lies in the fact that the synchronizing system is operated entirely by increasing the air pressure in the system. Since the increased air pressure acts both upon the mechanism for flashing the bulb and the mechanism for opening the shutter, one of the variables existing in other systems is eliminated.

With the stated and other objects in view there is provided in an illustrative embodiment of the invention an apparatus for obtaining synchronization of action between a camera shutter and a flash bulb. Operation of the shutter is effectuated by a piston which fits tightly into a chamber connected by a tube to the photographer's hand bulb. The piston is pushed forward into mechanical contact with the camera shutter upon the introduction of air into the chamber from the squeezing of the hand bulb. A helically wound spring supports the piston from the bottom of the piston chamber in such fashion that the spring opposes the movement of the piston from its normal position and thus helps to reset the piston to this position. An open passageway extends upward from the piston chamber into a recess in which is located a leaf spring member. This spring member serves as the movable contact of a normally open switch which controls the operation of an electric circuit for actuating the flash bulb. As soon as the end of the piston rod moves beyond the passageway, the air introduced into the piston chamber from the hand bulb is free to move upward into the passageway and press against the leaf spring, thus closing the switch and actuating the flash bulb. The leaf and helically wound springs are chosen with characteristics which will aid in the synchronized action of the shutter and flash bulb. This synchronization is further facilitated by the adjustability of the stationary contact of the switch which normally blocks the flow of current in the flash bulb circuit. This adjustable contact consists of a screw mounted in the wall of the chamber so that it can be moved towards or away from the leaf spring contact by rotation in its socket.

It will be understood that the foregoing general description and the following detailed description as well are exemplary and explanatory of the invention but are not restrictive thereof.

Figure 1:
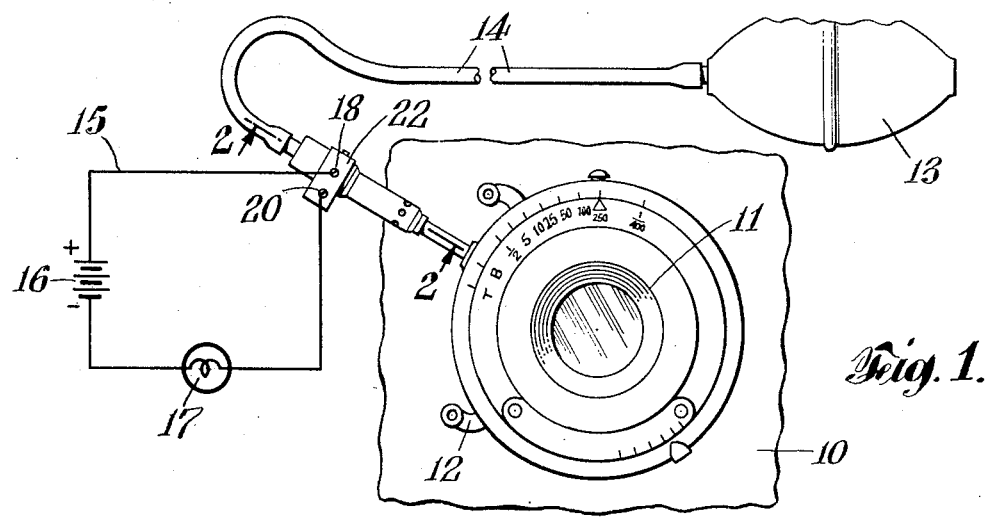
Fig. 1 is a view showing the synchronizing mechanism in relation to the shutter and the front end of the camera.

Referring now in detail to the embodiment of the invention shown by way of illustration in the accompanying drawings, and referring first to Fig. 1 there is shown a camera indicated generally by the reference numeral 10. This camera may be of any conventional type, with a shutter 11 and a lever 12 for opening the shutter when a picture is to be taken. The photograph is obtained by manually pressing the hand bulb 13 so that the air therefrom will flow through the flexible tube 14 and actuate a normally open switch, hereinafter to be described, in the electric circuit 15. This circuit comprises a power supply 16 and a flash bulb 17 in series with the normally open switch. When the switch is closed, current flows through the bulb 17 and heats the bulb so that the metal foil or wire and oxygen in the bulb will react to give a brief flash of light. The bulb 17 is of a conventional type such that the time delay between the closing of the circuit 15 and the chemical reaction can be controlled within narrow limits.

Figure 2:
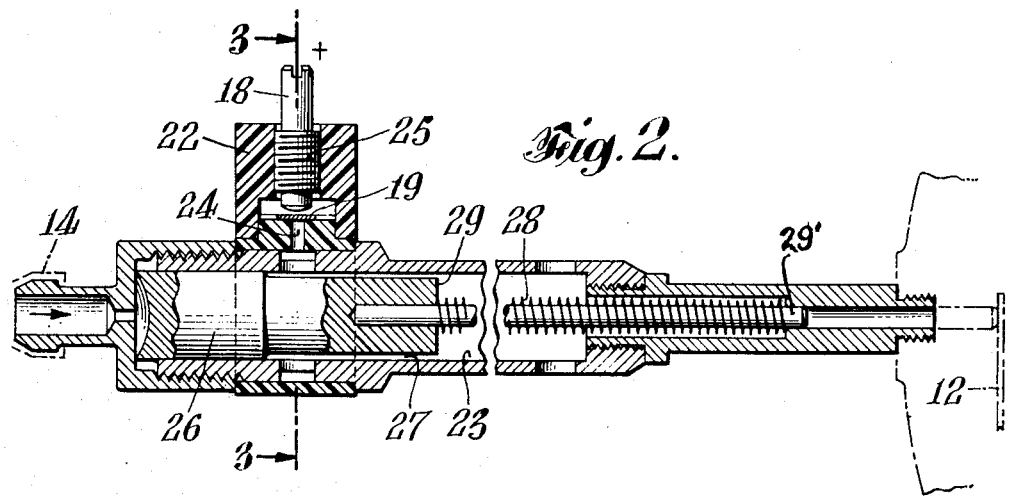
Fig. 2 is a cross-sectional front view of the synchronizing mechanism taken along line 2—2 of Fig. 1.
Figure 3:
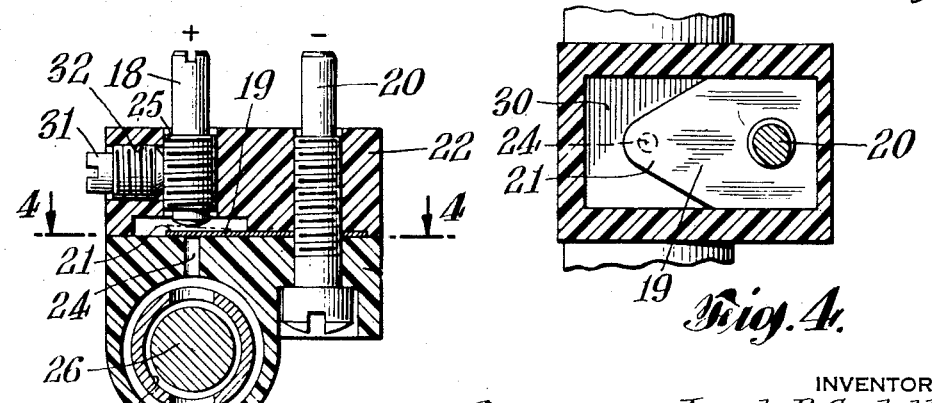
Fig. 3 is a cross-sectional side view of the synchronizer taken along line 3—3 of Fig. 2 and shows in particular the switching arrangement for actuating the flash bulb.
Figure 4:
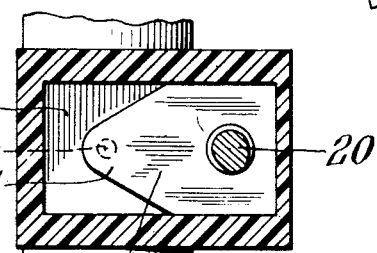
Fig. 4 is a cross-sectional plan view taken along line 4—4 of Fig. 3, specifically showing the form of the switching contact used to actuate the flash bulb circuit.

The normally blocked switch which controls the flow of current in the circuit 15 is shown more clearly in Figs. 2 and 3. A screw 18 is used as the stationary contact of the switch. The movable contact of the switch is illustrated by the numeral 19 and consists of a leaf spring fastened at one end to the table 30 by the lug 20, as shown in Fig. 4. Thus the free end 21 of the spring 19 is able to rotate about the lug 20 so that electrical contact can be made with the screw 18. The lug 20 serves as the second terminal of the switch, as may be seen from Fig. 3, and consequently is electrically insulated from the screw 18. When the spring end 21 is lifted so as to touch the screw 18, electrical continuity is established.

The contacts 18 and 19 are set in a housing member 22 which is connected to the outer periphery of a piston chamber 27. The chamber 27 has a hollow interior 23 and is connected at its left end to the tube 14, such that air can move from the bulb 13 through the tube 14 and into the chamber. A piston rod 26 extends along the length of the hollow interior 23 and has an expanded diameter at its left end, as shown in Fig. 2, such that it fits tightly into the chamber 27 for part of its length. When the hand bulb 13 is pressed, the air from the bulb presses against the rod and moves it to the right. As soon as the left end of the rod 26 has passed beyond a passageway 24 lying beneath the spring 19, the passageway is no longer blocked by the expanded portion of the rod, and the air is free to burst upwards into this passageway and push the spring 19 against the screw 18. The spring is resilient enough to move in response to the increased air pressure.

As previously explained, pressing of the bulb 13 causes the rod 26 to move to the right. A spring 28 abuts an inner vertical wall 29 of the piston rod at one end and an inner wall 29' of the chamber 27 at the other end. The spring is in a relaxed condition when the hand bulb 13 is in its expanded condition. Upon the squeezing of the bulb 13, the increased air pressure presses against the left end of the piston rod 26 and moves the piston rod to the right so that it will push against the trip lever 12 for opening the shutter. The spring 28 is consequently contracted and thus returns the rod 26 to its original position after the lever 12 is tripped. The spring has characteristics which will delay the passage of the rod 26 from its resting position to its tripping position for such a time that the light peak of the bulb will coincide with the maximum open position of the shutter. The traveling distance of the rod 26 is also chosen to facilitate the simultaneous action of the bulb 17 and the shutter 11.

Simultaneous action of the flash bulb and the shutter can also be facilitated by adjustment of components in the flash bulb circuit. Thus, the position of the screw 18 can be adjusted relative to the normal position of the leaf spring 19 by turning the screw in its socket 25. This change in relative position will alter the time interval between the pressing of the hand bulb 13 and the closing of the switch. After the position of the screw 18 has been adjusted by rotation in its socket, the screw may be locked by the action of the stud 31. This stud is placed in the housing member 22 so that its axis will form a skew angle with that of the screw 18 and it is long enough to bite into the screw 18 upon rotation in its socket 32. The axes of the screw 18 and stud 31 are shown as having a perpendicular relationship in Fig. 3.

The invention in its broader aspects is not limited to the specific mechanisms shown and described but departures may be made therefrom, within the scope of the accompanying claims, without departing from the principles of the invention and without sacrificing its chief advantages.

What I claim is:

1. A mechanism for synchronizing the operation of a flash bulb and camera shutter comprising, in combination, a cylinder, a piston in said cylinder, a switch for the flash bulb secured to said cylinder including a stationary contact and a movable contact, a passage communicating with the interior of said cylinder to be covered and uncovered by said piston and normally covered by said movable contact, said latter contact being adapted to be moved by fluid pressure in said passage when uncovered by said piston from a covering position with respect to said passage into contact with said stationary contact to close said switch, means for actuating a camera shutter upon movement of said piston in said cylinder, and fluid pressure producing means connected to said cylinder for inducing a pressure therein to close said switch and move said piston to actuate the camera shutter.

2. A mechanism for synchronizing the operation of a flash bulb and camera shutter comprising, in combination, a cylinder, a piston in said cylinder, a switch for the flash bulb secured to said cylinder including a stationary contact and a movable contact, a passage intermediate the ends of said cylinder communicating with the interior thereof and normally covered by said movable contact, said latter contact being adapted to be moved by fluid pressure in said passage from a covering position with respect to said passage into contact with said stationary contact to close said switch, means at one end of said cylinder for actuating a camera shutter upon movement of said piston in one direction in said cylinder, means normally biasing said piston in the opposite direction toward the opposite end of said cylinder to cover said passage, and fluid pressure producing means connected to said opposite end of said cylinder for inducing a pressure therein to move said piston whereby said passage is uncovered to close said switch and said shutter actuating means are actuated.

3. A mechanism for synchronizing the operation of a flash bulb and camera shutter comprising, in combination, a cylinder adapted to be secured to a camera, a piston in said cylinder, a switch housing secured to said cylinder, a flexible and a stationary contact in said housing, intercommunicating passages in said housing and said cylinder, said flexible contact normally closing said passage in said housing to be moved by fluid pressure in the passage to contact said stationary contact to close said switch, said passage in said cylinder being intermediate the ends thereof, a rod at one end of said piston for actuating a camera shutter upon movement of said piston in one direction, spring means biasing said piston in the opposite direction to normally cover said passage in said cylinder, and fluid pressure producing means communicating with the end of said cylinder for inducing a pressure therein to move said piston against the compression of said spring means to move said rod to actuate a camera shutter, and to uncover said cylinder passage by said piston to move said flexible contact to said stationary contact.

JOSEPH P. CASTELLANO.

REFERENCES CITED

The following references are of record in the file of this patent:

UNITED STATES PATENTS

| Number | Name | Date |
|---|---|---|
| 1,076,091 | Allen | Oct. 21, 1913 |
| 1,120,710 | Goldensky et al. | Dec. 15, 1914 |
| 1,973,937 | Tracy | Sept. 18, 1934 |
| 1,988,022 | Smith | Jan. 15, 1935 |
| 2,039,193 | Schwarz | Apr. 28, 1936 |
| 2,153,277 | Sharp | Apr. 4, 1939 |
| 2,238,453 | Small | Apr. 15, 1941 |